United States Patent [19]
Leorat et al.

[11] 3,885,476
[45] May 27, 1975

[54] PRESSURE REGULATION CONTROL VALVE FOR AN HYDRAULIC CONTROL SYSTEM OF AN AUTOMATIC POWER TRANSMISSION

[75] Inventors: François Jean-Louis Leorat; André Mouttet, both of Billancourt, France

[73] Assignees: Regie Nationale des Usines Renault, Billancourt; Automobiles Peugeot, Paris, both of France

[22] Filed: Feb. 1, 1974

[21] Appl. No.: 438,768

Related U.S. Application Data

[63] Continuation of Ser. No. 264,332, June 19, 1972, abandoned.

[30] Foreign Application Priority Data

July 21, 1971  France .............................. 71.26656

[52] U.S. Cl. .................................... 74/863; 74/867
[51] Int. Cl. ............................................ B60k 19/00
[58] Field of Search ............ 74/863, 864, 867, 868, 74/869, 753; 192/.032, .033, .076, 103 F

[56] References Cited
UNITED STATES PATENTS
3,513,727  5/1970  Shimosaki ............................ 74/868
3,587,353  6/1971  Iijima .................................... 74/868
3,625,322  12/1971  Nagamatsu ........................ 192/.032

Primary Examiner—Benjamin W. Wyche
Assistant Examiner—John Reep
Attorney, Agent, or Firm—Stevens, Davis, Miller & Mosher

[57] ABSTRACT

A pressure regulation control valve having a body including at least first and a second flow ways for communication with friction devices of a hydraulic control system of an automatic power transmission mechanism, a distributor differential spool member slidable in the body for feeding said flow ways, an inlet communicating with a pressure fluid pump outlet through a flow restriction device, and outlets communicating with the friction devices operated through a selector valve, the inlet of the restriction device being connected simultaneously to a first end face of the distributor spool member and to the inlet of the first flow way communication, and the outlet of the restriction device being connected to a second end face of the distributor spool member, the distributor in a first initial position being in abutment on said valve body under action exerted by the pressure fluid on the first and second faces of the distributor spool, the two flow ways being then obstructed; the distributor in an intermediate position due to the action of fluid pressures on the first and second faces and on a third intermediate face of the distributor spool, permitting a regulated pressure to be obtained in the first flow way communication, the second flow way communication still being obstructed; the distributor spool member in its third final position, due to the action of pressure fluid on the three faces of the distributor spool member, permitting the aperture of both the first and second flow way communications.

4 Claims, 5 Drawing Figures

PRESSURE REGULATION CONTROL VALVE FOR AN HYDRAULIC CONTROL SYSTEM OF AN AUTOMATIC POWER TRANSMISSION

This is a continuation, of application Ser. No. 264,332, filed June 19, 1972, now abandoned.

The present invention relates in general to hydraulic control systems of automatic transmission mechanisms for motor vehicles, and is directed to marked improvements in systems of this character.

As a rule, automatic transmission mechanisms providing stepped gear ratios comprise:

A hydrokinetic troque converter disposed between the thermal engine and the epicyclic gear change-speed mechanism;

hydraulically controlled friction clutches for coupling the epicyclic gears to rotating shafts;

hydraulically controlled friction brakes for holding against rotation one or a plurality of epicyclic gears;

a volumetric pump supplying hydraulic fluid to the transmission control circuit;

A hydraulic control system for controlling the selective engagement of said friction clutches or brakes in order to provide the various gear ratios of the transmission mechanism.

In the following disclosure the term "hydraulic receiver" means a hydraulically controlled coupling device which may consist of a friction brake or a friction clutch.

To ensure a smooth change from one ratio to another the grip exerted by the relevant hydraulic receivers must be modified as a function of the engine load and the vehicle speed.

In fact, if the torque transmission capacity of the hydraulic receivers is too high when one of them is controlled for producing the desired speed change, the engagement of the hydraulic receiver is too fast and a shock is produced; on the other hand, if this torque capacity is not sufficient a racing slip in the hydraulic receiver and a certain engine recing will take place.

Moreover, when a gear ratio is engaged the corresponding friction clutches or brakes must be capable of transmitting the engine torque without any slipping.

The torque to be transmitted from the input shaft of the transmission mechanism is relatively high when starting the vehicle from rest and at low relative speed of the vehicle (during the torque multiplying phase of the hydrokinetic torque converter operation), and then decreases down to a relatively low value as the vehicle speed increases.

It is the essential object of the present invention to provide a simplified hydraulic control system adapted automatically to harmonize for each specific driving or running condition of the vehicle the torque transmission capacity of the hydraulic receivers with the permanent torque (when a gear ratio is engaged) and the transitory torque (during the engagement of the various gear ratios) by properly adjusting the hydraulic control pressure.

This hydraulic control device is adapted to create an overpressure in the hydraulic fluid controlling the friction receivers during the starting of the vehicle from rest, and then to gradually decrease this overpressure in order to bring about a hydraulic fluid pressure variation similar to the variation in the torque available in the input shaft of the transmission mechanism. The value of this overpressure and its variation rate can be changed as a function of the engine load and also of the vehicle speed.

In hitherto known hydraulic control systems the modification of the hydraulic pressure as a function of the vehicle speed may be obtained by using a hydraulic governor or regulator adapted to deliver fluid under a pressure depending on the output speed of the transmission. This pressure is utilized for monitoring the valve regulating the pressure controlling the hydraulic receivers.

The hydraulic governor or regulator is mounted on the output shaft of the transmission or driven from this shaft through gearings. Its over-all dimensions are relatively large and increases inasmuch the over-all dimensions and weight of the transmission.

This governor is relatively sophisticated and comprises as a rule two regulating stages, namely a low-speed stage and a high-speed stage.

On the other hand, the presence of this governor implies the use of relatively long hydraulic conduits for connecting same to the set of valves disposed at the lower portion of the transmission.

Since these hydraulic conduits extend from a fixed set of valves and a rotary hydraulic governor, rotary seals difficult to manufacture and keep in a leak-free state must be used.

It is another object of this invention to produce a variation in the control pressure of the hydraulic receivers from an information subordinate to the engine speed. This information consists of the value of a pressure loss created through a gauged orifice by the delivery output of the volumetric pump incorporated in the transmission.

Since this device can be incorporated in the set of valves the transmission, the over-all dimensions can be reduced considerably while eliminating hitherto existing hydraulic conduits.

In the following disclosure the term "distributor face" applies to a surface extending between the bore of the distributor and one or a plurality of valve spools to which the application of hydraulic pressure is likely to create a valve moving effort.

The term "flow way" of the distributor denotes in the following disclosure the communication between an input line and an output line via a passage formed between the bore of the distributor body and one or a plurality of valve spools.

According to a specific feature characterizing this invention, one of the delivery lines receiving the fluid output from the volumetric pump comprises a main gauged orifice having its inlet connected jointly to a first face of a throttling distributor having several flow ways and to the input of a first flow way of said distributor, the outlet of said gauged orifice being connected jointly to a second face of said distributor, to the output of the first flow way and to the input of a second flow way of said distributor, the output of said second flow way being connected jointly to a third face of said distributor, to an auxiliary gauged orifice opening into a fluid reservoir, and to one of the faces of the spool or slide member of a valve incorporated in a pump fluid pressure regulating device.

Other features and advantages of this invention will appear as the following description proceeds with reference to the attached drawings illustrating diagrammatically by way of example a typical form of embodiment of the invention. In the drawings.

Figure 1:
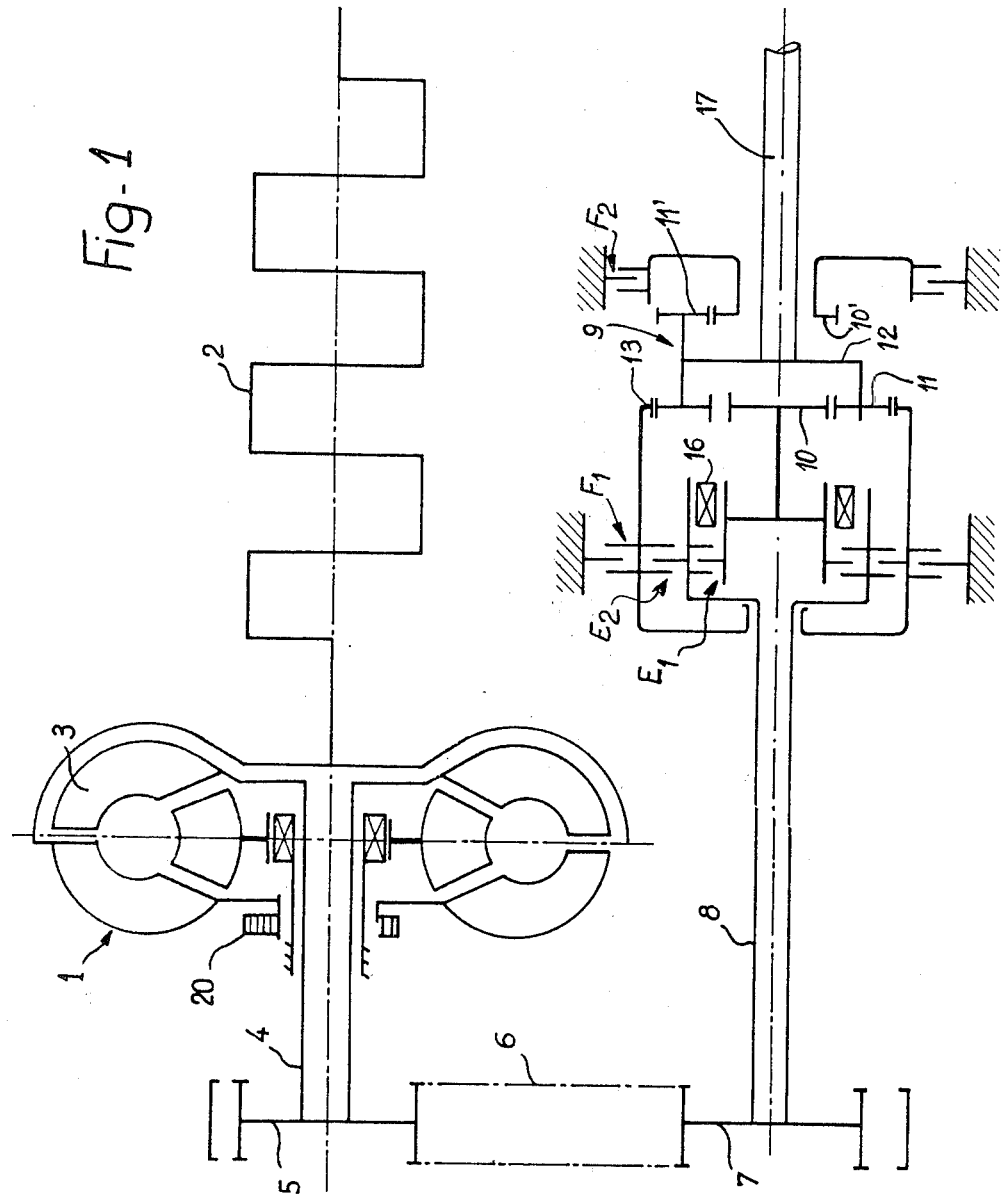
FIG. 1 is a diagrammatic general illustration of an automatic transmission mechanism of motor vehicle.

Referring first to FIG. 1, the hydrokinetic torque converter 1 is mounted on the output end of the engine crankshaft 2. The output member 3 or turbine of the torque converter is rigid with a shaft 4 provided with a sprocket or pinion 5. A transmission member 6, for instance a chain, transmits the drive from sprocket 5 to another sprocket or pinion 7 rigid with the input shaft 8 of the change-gear mechanism of the epicyclic type. An epicyclic train denoted in general by the reference numeral 9 comprises a pair of sun gears 10, 10' and two sets of planet pinions 11, 11' of different lengths, journalled on a common planet carrier 12. This epicyclic gearing also comprises an internally toothed annulus 13 meshing with planet pinions 11, 11'.

Two concentric friction clutches $E_1$, $E_2$ adapted to lock members $F_1$ and $F_2$ against rotation and a free-wheel mechanism 16 are provided for giving three forward speeds and reverse in the output shaft 17 of this transmission mechanism.

Figure 2:
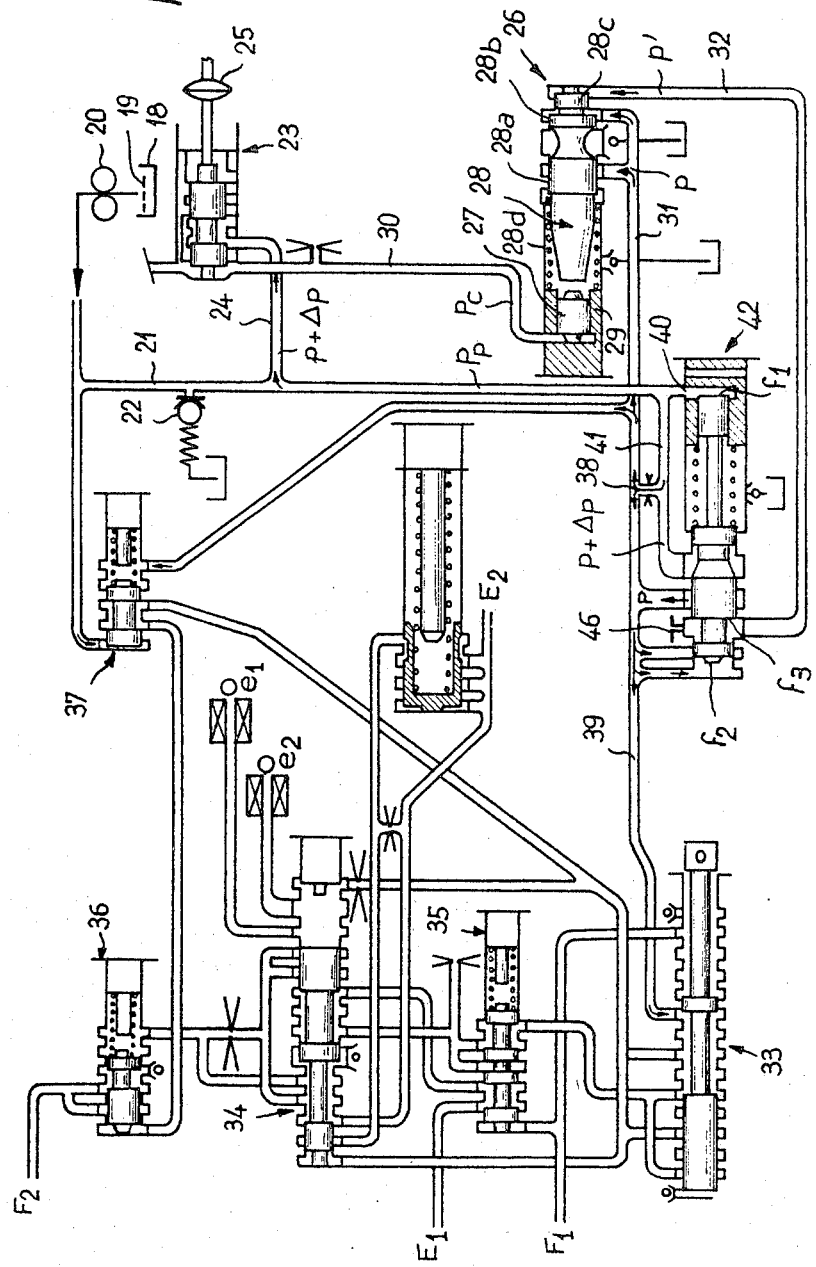
FIG. 2 is a diagrammatic illustration of a hydraulic system according to this invention for controlling the transmission mechanism of FIG. 1.

Referring to FIG. 2, it will be seen that a reservoir 18 is adapted to supply hydraulic fluid through filter means 19 to a gear pump 20 delivering the fluid under pressure to a feed line 21 having an overpressure or safety valve 22 inserted therein.

The pressure regulating device comprises a pressure modulating valve 23 supplied via a pipe line 24 branched off the main pipe line 21 and receiving through a manometric or pressure-responsive diaphragm device 25 an information subordinate to the vacuum value prevailing in the induction manifold (not shown) of the vehicle engine.

The pressure regulating device comprises a pressure regulating valve 26 consisting essentially of a pair of adjacent cylindrical spool valve or like members 27, 28, the latter comprising three spools 28a, 28b and 28c separated by stem portions. The body 29 of the pressure regulating valve 26 comprises ports connected to three feed lines 30, 31 and 32, respectively.

The control device further comprises a manual selector valve designated in general by the reference numeral 33, which is associated with a solenoid-operated hydraulic valve 34. These valves are adapted, through control valves 35, 36 and 37, to actuate four hydraulic receivers E1, E2, F1, F2 constituting friction devices adapted to absorb a torque increasing in proportion with the hydraulic pressure applied thereto. These receivers control in turn the epicyclic gearing transmission shown diagrammatically in FIG. 1.

The delivery pipe line 21 connects the output of pump 20 to the input of a main gauged orifice 38 having its output connected to the pressure regulating valve 26 via pipe line 31, and also to manually operated selector valve 33 via another pipe line 39.

Figure 3:
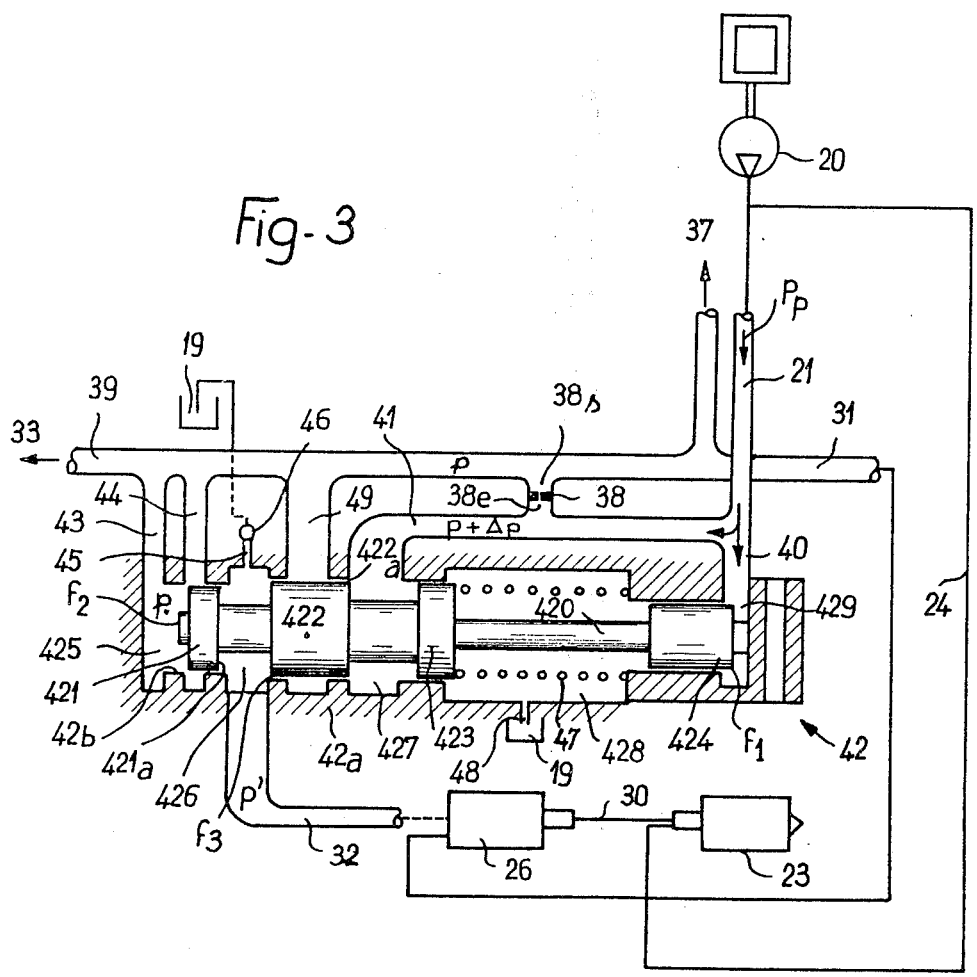
FIG. 3 is a diagrammatic section showing the multi-way throttling distributor.

As illustrated in detail in FIG. 3, the input $38_e$ of said main gauged orifice 38 is connected to a pair of passages 40, 41 supplying hydraulic fluid to a throttle-type distributor designated generally by the reference numeral 42. According to a specific feature of this device, passage 40 opens into a first face $f_1$ of distributor 42, and passage 41, in a given right-hand position of the spool valve, as seen in the figure, opens into the pipe line 39 leading to the outlet $38_s$ of the main gauged orifice. The path from passage 41 to pipe line 39 constitutes the first flow way $V_1$ of distributor.

The outlet $38_s$ of said main gauged orifice is also connected to a pair of parallel passages 43, 44. Passage 43 opens into the chamber for exerting a fluid pressure against the second face $f_2$ of distributor 42. The fluid pressure in passage 44 is exerted (in a left-hand position of the spool valve of this distributor) against a third face $f_3$ of distributor 42. This passage 44 then opens into passages 32 and 45, opposing each other. The communication between passage 44, on the one hand and pipe line 32 and passage 45 on the other hand, constitutes the second flow way $V_2$ of distributor 42.

According to another feature characterizing device, the pipe line 32 is connected to one port of pressure regulating valve 26 and passage 45 is connected to the fluid reservoir 19 via an auxiliary gauged orifice 46.

The above-described device operates as follows:

Let $Q_{20}$ be the fluid output of volumetric pump 20; it is known that this output $Q_{20}$ is proportional to the rotational speed of the vehicle engine. This output creates in pipe line 21 a pressure $P_p$ and is subjected to a pressure loss $\Delta_p$ between the inlet $38_e$ and outlet $38_s$ of gauged orifice 38.

On the other hand, let $p$ denote the output pressure of this orifice 38, the input pressure thereof will be $p+\Delta_p$. The pressures exerted in passage 40 (connected to inlet $38_e$) and passage 44 (connected to outlet $38_s$) are thus $p+\Delta_p$, and $p$, respectively. Under these conditions, it is clear that the pressures $p$ and $p+\Delta_p$ are exerted in opposition against the faces $f_1$ and $f_2$, respectively, of distributor 42.

Consequently, the pressure $p'$ exerted in pipe line 32 and against face $f_3$ will depend on $p$, $\Delta_p$ and also on the construction characteristics of this distributor 42.

Since the pressure regulating valve 26 is supplied via pipe lines 31 and 32, this valve will receive fluid under two different pressures $p$ and $p'$.

The function of this pressure regulating valve is well known; however, it should be remembered that it comprises a spool member 28 having different active surface areas in the various fluid supply chambers.

According to another feature characterizing this invention, the distributor 42 illustrated in FIG. 3 comprises a spool valve 420 provided with four cylindrical spools 421, 422, 423, 424.

Spool 421 provides with the distributor body 42a a first chamber 425 into which opens the passage 43 in which a pressure $p$ prevails. The spools 421 and 422 form with the distributor body another or second chamber 426 into which opens on the one hand the pipe line 32 in which the pressure $p'$ prevails, and on the other hand the pipe line 45 leading on the other hand to the fluid reservoir 19 via the auxiliary gauged orifice 46. The second chamber 426 has therefore end walls of unequal surface areas, the minor one being bounded by the edge 421a of spool 421 and by the bore 42b receiving the spool 420.

The spools 422 and 423 provided with the distributor body a third chamber 427 connected to the passage 41 in which pressure $p+\Delta_p$ prevails.

Spools 423 and 424 form with the distributor body a fourth chamber 428 containing a spring 47 having a force R, this fourth chamber communicating with reservoir 19 via a port 48.

The spool 424 forms with the distributor body 42a a fifth chamber 429 into which opens the pipe line 40 in which the pressure $p+\Delta_p$ prevails.

If $S_{421}$, $S_{422}$, $S_{423}$, $S_{425}$ are the active surface areas of spools 421, 422, 423, 424 respectively, the condition of equilibrium of spool valve 420 may be expressed as follows:

$$p \cdot S_{421} + p'(S_{422} - S_{421}) = (p+\Delta_p) \cdot S_{424} + R.$$
$$p'(S_{422} - S_{421}) = \Delta_p \cdot S_{424} + R + p(S_{424} - S_{421}) \quad (1)$$

Since pressure $p$ is a pressure regulated by the pressure regulating valve 26, it is clear that:

$$p' = f(\Delta_p \cdot p \cdot R) \quad (2)$$

As shown in FIG. 2, the pipe line 32 supplies fluid to the pressure regulating valve 26 under a pressure $p'$. Therefore, $p$ and $p'$ are in the following relation:

$$p = f1 (p') \quad (3)$$

A simple calculation will permit of finding the relation existing between $p$ and $\Delta_p$ from the above given relations (2) and (3).

On the other hand, it will be seen that the output $Q_{20}$ of pump 20 depends on the rotational speed of the vehicle engine and therefore on the rotational speed VT of turbine 3 of hydrokinetic torque converter A (FIG. 1).

Since the pump output $Q_{20}$ undergoes a pressure loss $\Delta_p$ between the inlet $38_e$ and outlet $38_s$ of gauged orifice 38, if is a very simple matter to prove that this loss of pressure $\Delta_p$ as well as the pressure $p'$ are a function of the speed of the turbine of said converter.

To understand the mode of operation of the device, it is only necessary to refer to FIG. 2 wherein the pressure regulating valve 26 comprises a spool valve 28 having its active faces responsive to three pressure values:

(1). Pressure $p'$, i.e. the pressure prevailing in pipe line 32 as a function of the velocity of rotation of turbine 3;

(2). Pressure $p$, i.e. the pressure prevailing in pipe line 31 and constituting the circuit pressure, and (3). Pressure $p_c$, i.e. the pressure prevailing in pipe line 30 and depending on the angle $\alpha$ of opening of the gas throttle valve.

When the spool 28 of pressure regulating valve 26 is in a position of equilibrium, a relation of the type $p = F(p_c \cdot p')$ (4) may be established, with due consideration for the various active surface areas of spool member 28 and of the constants of its return spring $28_d$.

It is thus clear that at each value of $p_c$ there is a different relation between $p$ and $p'$.

Figure 5:
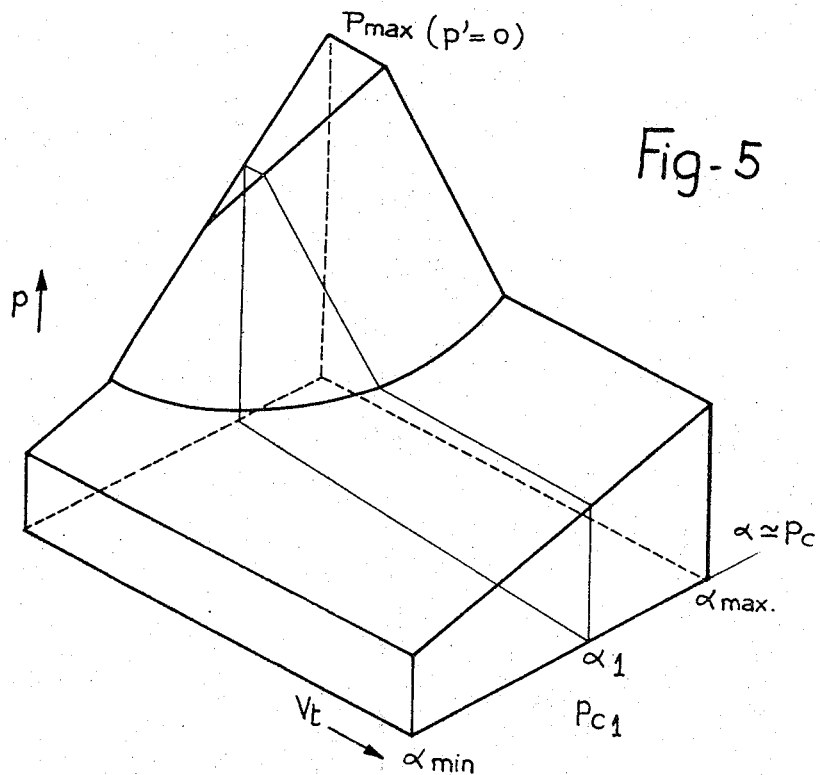
FIG. 5 is a diagram plotting the variations in the hydraulic pressure P controlling the friction receivers against the speed $V_T$ of the input shaft of the torque converter and also the engine load $\alpha$.

FIG. 5 is a three-dimensional diagram showing the relation between the above-defined pressures $p$, $p'$ and $p_c$.

Considering the starting of a vehicle from rest and the increment in its relative speed with a predetermined opening $\alpha$ of the throttle valve, it will be seen that the pressure $p_c$ has in this case a predetermined value $p_{c1}$. According to said relation (4) the pressure $p$ is only a function of pressure $p'$, i.e. of the loss of pressure $\Delta_p$.

When starting the vehicle the engine speed is minimum, the output of pump 20 is also minimum and the loss of pressure $\Delta_p$ through orifice 38 is minimum. The spool member 420 is in its right-hand end or abutting position, as seen in FIG. 3. The pipe line 32 is not supplied via passage 44 and is connected only to reservoir 19 via port 46 and leakage passage 45. The pressure P' is divided and the pressure P is maximum. This spool member 420 will remain in its right-hand end position until the fluid output of pump 20, as it rises, creates a loss of pressure $\Delta_p$ sufficient for moving the spool member to the left, until the edge $421_a$ uncovers port 44. Thus, a regulated pressure value $p'$ is obtained in pipe line 32 due to the leakage output through orifice 46, and also to the action exerted by this pressure on the differential area $S_{422} - S_{421}$.

As the engine speed increases, the loss of pressure $\Delta_p$ increases likewise and to each value of $\Delta_p$ there corresponds a specific value of pressure $p'$, whereby the latter increases as the loss of pressure $\Delta_p$ increases. Thus, according to a known feature characterizing the pressure regulating valve 26, the action exerted by pressure $p'$ on spool valve 28 causes the pressure $p$ to decrease as the speed increases. It will thus be seen that pressure $p'$ increases as pressure $p$ decreases.

When pressure $p'$ attains a value equal to pressure $p$, the regulation of $p'$ through the flow way 44–32 is completed. Any further increment in the loss of pressure $\Delta_p$ will upset the equilibrium of spool valve 420 as it moves to the left, thus uncovering with its edge $422_a$ a passage 49. A novel regulation condition is established and any further output increment will be by-passed through passage 49, so that the loss of pressure through the gaged orifice 38 will remain constant.

It is clear that the same mode of operation will be obtained at different engine load values, and that the variation is pressure $p$ takes place continuously between the two end positions of the accelerator pedal or throttle control member.

As the three steps of the operation of the device may be defined as follows:

1. $p'=0$, spool valve 420 abutting to the right (FIG. 3), with max. $p$,
2. $p'=f(\Delta_p)$ regulation by edge $421_a$, with decreasing $p$,
3. $p'=p$, by-pass via edge $422_a$, $\Delta_p$ being constant, it will be noted that on the other hand the thresholds of these different steps change with the engine load.

More particularly, given a low engine load and according to the specific dimensions selected for the device, the steps (1) and (2) may be dispensed with and the output by-passed immediately when the vehicle is started.

Figure 4:
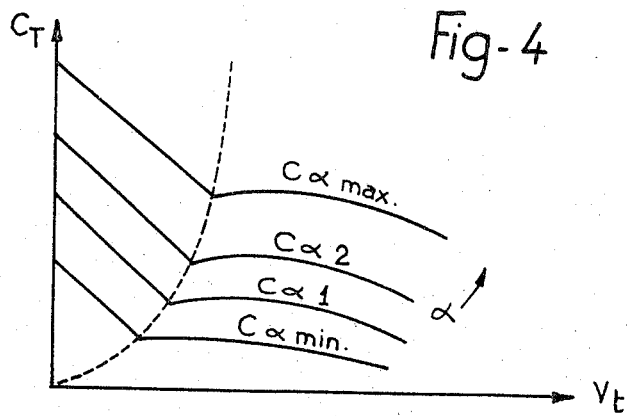
FIG. 4 is a diagram illustrating the variations in the torque acting upon the receiving or input shaft of the hydrokinetic torque converter as a function of the speed of said shaft.

Referring to FIG. 4 showing the general trend of the variations in the torque measured on the driven shaft (turbine torque) as a function of the input shaft speed, a set of curves such as $C\alpha_1$, $C\alpha_2$ within the range determined by the two end curves corresponding to the end values ($\alpha$ min. and $\alpha$ max.) of the angular opening movement of the engine gas throttle, is obtained.

Considering the foregoing, it will be seen that it is always possible, under any circumstances, to ascertain the characteristics of distributor 42 so that the variations in the control pressure $p$ of the hydraulic receivers, of which the general trend is illustrated in the diagram of FIG. 5, may better adapt themselves to the torque variations of which the general trend is illustrated in FIG. 4.

Of course, various modifications and changes may be brought to the above-described practical form of embodiment of this invention without departing from the basic principles thereof, as will readily occur to those conversant with the art.

What is claimed as new is:

1. A pressure regulation control valve for a hydraulic control system of an automatic power transmission mechanism having friction devices for providing stepped gear ratios and comprising: a pressure fluid pump, a fluid reservoir, a pump output pressure regulating device and input and output lines for the fluid from and toward said friction devices operated through a selector valve, said control valve comprising:

in a body first and a second output conduits for communication between a central control valve and said friction devices lines; a distributor member of the slidable differential spool type with a plurality of control faces; a fluid pressure restriction means having its inlet in communication both with a delivery line communicating said pump with a first end face of the distributor spool member and to the input of a first flow way leading to a feed line of said selector valve, and its outlet in communication jointly with a second end face of said distributor spool member and with the input of a second flowway communicating with a guaged orifice in the body opening into said fluid reservoir and into a connection line of said pump output pressure regulating device, wherein:

a. in a first initial position said distributor spool member is in abutment with said valve body under action exerted by fluid pressure on said first end face and said second end face of said distributor spool member, said first flow way and second flow way;

b. in a second intermediate position of said distributor spool member, obtained by the action of fluid pressure on said first and second end faces of said distributor spool member and on a third intermediate face near the output of said second flow way, both first and second flow ways are obstructed; and c. in a third position of said distributor spool member, obtained by the action of fluid pressures on said first, second and third faces of said distributor spool member, said first and second flow ways are opened.

2. A valve according to claim 1, in which the spool member of the distributor comprising a plurality of flow ways provides in conjunction with the body of said distributor five chambers separated from one another by four spools of said spool member, the first spool being bound by a first regulation edge and the second spool by a second regulation edge, said first edge partially bounding a chamber having end walls of unequal surface areas.

3. A valve according to claim 2, in which said first regulation edge bounds with the bore for said spool member the wall having the smaller surface area of a second chamber separated by said first and second spool and into which opens a pipe line directing the hydraulic fluid towards the pressure regulating device and a leakage passage in communication with said fluid reservoir through said gauged orifice.

4. A valve according to claim 3, in which said second regulation edge of the spool member of said distributor forms with the bore for said spool member and a fluid passage, a throttled passage for permitting a throttled fluid circulation between the inlet and outlet of said fluid pressure regulating device.

* * * * *